R. S. SMITH, Jr.
ELECTRICAL INDICATOR.
APPLICATION FILED JAN. 13, 1913.
1,152,986. Patented Sept. 7, 1915.
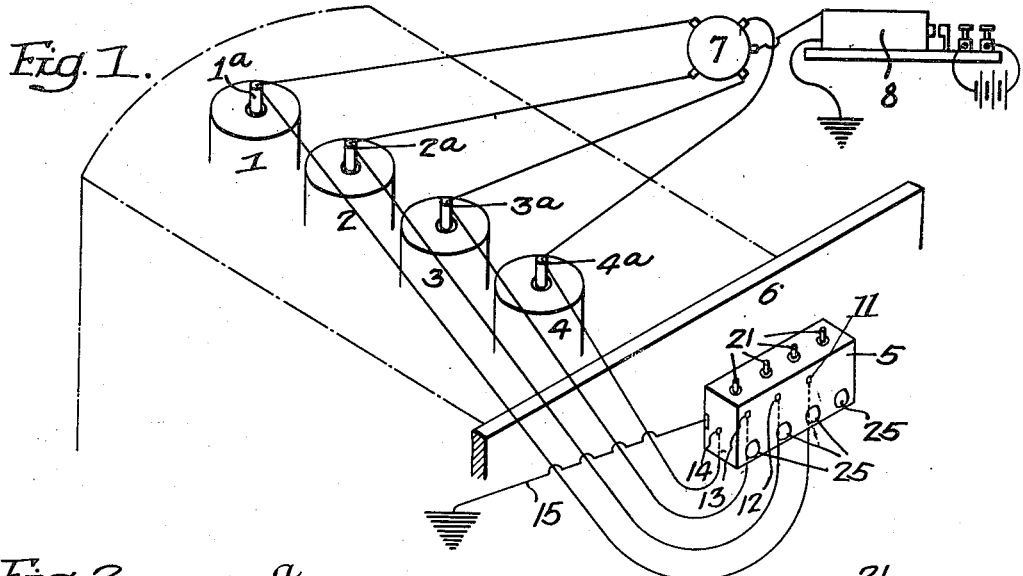
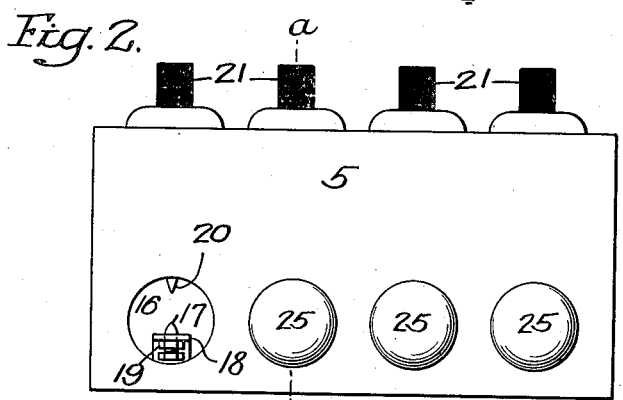
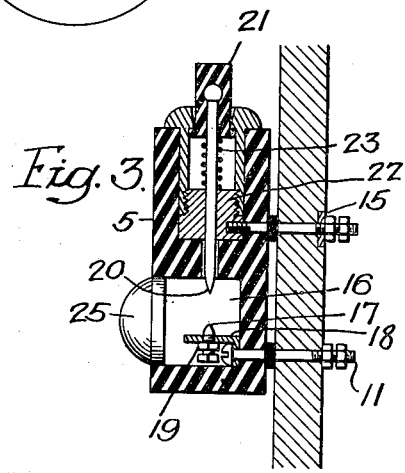
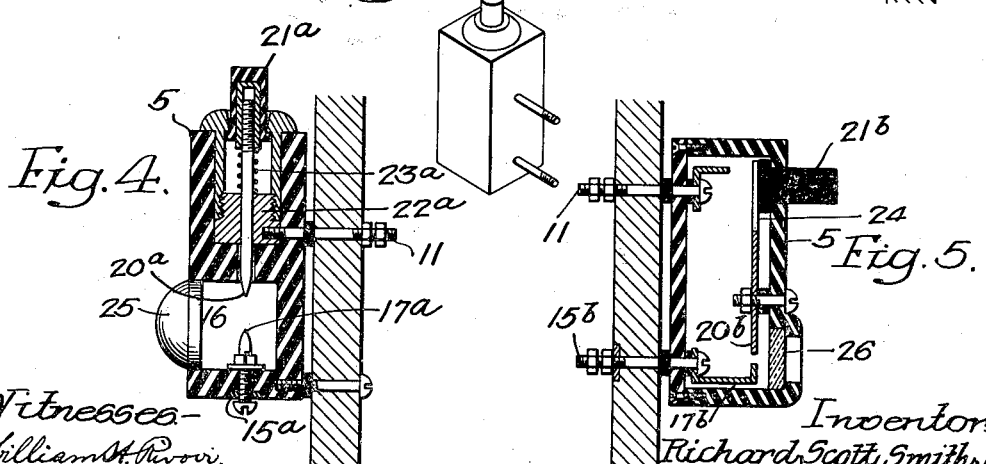
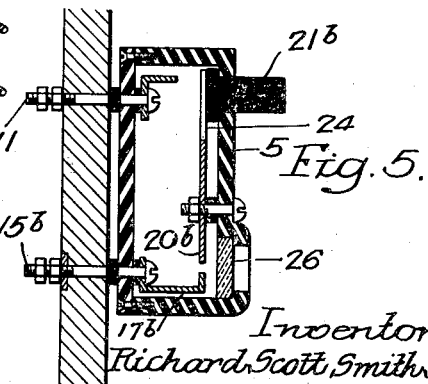
Witnesses—
William H. Rivoir.
Wm. E. Shupe.
Inventor—
Richard Scott Smith Jr.
by his Attorneys.—
Howson & Howson

UNITED STATES PATENT OFFICE.

RICHARD SCOTT SMITH, JR., OF WOODBURY, NEW JERSEY, ASSIGNOR OF ONE-HALF TO GEORGE C. GUNN, OF BURLINGTON, NEW JERSEY.

ELECTRICAL INDICATOR.

1,152,986.  Specification of Letters Patent.  Patented Sept. 7, 1915.

Application filed January 13, 1913. Serial No. 741,704.

*To all whom it may concern:*

Be it known that I, RICHARD SCOTT SMITH, Jr., a citizen of the United States, and a resident of Woodbury, Gloucester county, New Jersey, have invented certain Improvements in Electrical Indicators, of which the following is a specification.

The object of my invention is to provide an instrument applicable to automobiles for the purpose of enabling the driver to ascertain at any time the condition of the ignition system, the spark plugs, and, in the case of indifferent operation of the several cylinders, the approximate or actual cause of the trouble.

My invention consists of an improved form of testing element or indicator which may be arranged singly or in multiple and carried by a suitable casing preferably mounted on the dash of the car; each testing element or indicator being in circuit with one of the spark plugs and arranged to form a spark gap with a common ground; one of the elements of such spark gap being movable and maintained normally at such a distance from the other element connected to the common ground as to preclude the formation of a spark gap except under extraordinary circumstances.

A further object of my invention is to provide a structure that is at once neat, of few parts, suitable for the desired work, and readily operable by relatively unskilled persons.

These and other features of my invention are more fully described hereinafter, reference being had to the accompanying drawings, in which:

Figure 1, is a perspective view, more or less diagrammatic, illustrating the wiring connections between the spark plugs and the indicator; Fig. 2, is an enlarged face view of the indicator; Fig. 3, is a sectional view on the line $a$—$a$, Fig. 2; Fig. 4, is a similar sectional view illustrating a modified construction; Fig. 5, is a similar view illustrating a further modification within the scope of my invention, and Fig. 6, is a perspective view of an indicator unit available for a single cylinder, which with other similar units properly connected may be employed with a plurality of cylinders in circuit therewith.

In the drawings herewith, 1, 2, 3 and 4, represent the cylinders of an automobile, equipped with spark plugs indicated at $1^a$, $2^a$, $3^a$ and $4^a$, which may be of any suitable type having the ordinary form of terminals providing a spark gap for the ignition of an explosive charge, and 5 represents the improved indicating or testing instrument forming the subject of my invention, which may be carried on the dash 6 of the car. The usual timer 7 and magneto 8 are illustrated diagrammatically as in circuit with the spark plugs and a battery.

In the present instance, the instrument 5 is shown as comprising a plurality of binding posts 11, 12, 13 and 14, connected respectively to the several spark plugs, and a suitable connection in the form of a bus bar 15, which is grounded.

The shell of the structure which is of insulating material and may preferably be of wood, fiber or any proper material, is recessed at 16 in its lower part, and in each of these recesses, in the form of structure shown in Figs. 2 and 3, there is an adjustable point 17 supported by a plate 18 in electrical connection with one of the binding posts 11, 12, *et seq.* These points 17 are in the form of screws with lock nuts 19 and are adjustable in order that the width of the spark gap may be properly regulated. Above each of these fixed points is a movable point 20 carried by a button 21, and these points may be slidably mounted in metal collars 22 in electrical engagement with the grounded bus bar connection 15. The points 20 are spring supported, springs being shown at 23, and their range of movement is such that full depression of the buttons 21 will bring them into proper position with relation to the points 17 for the formation of the desired jump spark.

If desired, the several binding posts 11, 12, 13 and 14, may be in electrical connection with metallic collars $22^a$ disposed above relatively fixed contact points $17^a$, each of which collars is apertured for the reception of a movable point $20^a$ normally supported by springs $23^a$ and connected to push-buttons $21^a$ so that they may be depressed to form with the contact points $17^a$ jump spark gaps, as shown in Fig. 4. The relatively fixed contact points $17^a$ in this instance are in electrical engagement with the grounded bus bar connection 15ª, and the movable contact points 20ª are adjustable; being threaded into the push buttons. Either contact may be grounded; it making no difference whether it is the movable contact having a fixed relation, or the relatively fixed contact having adjusting means, or the adjustable movable contact point, or the fixedly mounted fixed contact points.

In the structure shown in Fig. 5, spring contact members 24 having fixed contact points 20ᵇ in substantially fixed relation with respect to contacts 17ᵇ in electrical engagement with a grounded bus bar connection 15ᵇ are employed. In this instance the spring members are moved in engagement with terminals connected to binding posts in electrical engagement with the spark plugs. It will be understood, of course, that either of these contacts may be adjustable with respect to the other and that the contacts or the bus bar may be in electrical connection with the spark plugs.

The recess 16 in the shell or casing in which the jump spark is formed by movement of one of the contact points is preferably closed by a lens 25, or a glass plate 26, in order that the spark produced shall have no dangerous effect and yet shall be entirely luminous to the operator.

The instrument is used in the following manner: To test out the condition of the several spark plugs, all but one of the push-buttons are pressed so as to bring their respective contacts into proper position with respect to the other set of contacts for the formation of jump sparks, leaving the fourth connection open. If the spark plug of this fourth cylinder is in working order, the explosions will go on as usual. If, however, no explosion is occurring, this condition is due to one of three things; lack of current, disabled spark plug, or open valve.

The exact condition can then be determined by pressing the button in electrical connection with the spark plug of this particular cylinder. If the electrical connections are found to be in order, a spark will be formed in the instrument across the gap between the point of the movable contact and the point of the fixed contact, lack of current as a cause for the trouble is dismissed, and the driver will know that the spark plug or its wiring is out of order. If, however, no spark is made at the gap in the instrument between the respective contact points and sparks are obtained at the other gaps, it indicates that there is either a break in the wiring of the particular connection under test or other electrical trouble. The exact condition can be easily ascertained and readily corrected by the driver.

All of the cylinders are successively tested out in the same manner, by pressing three of the push-buttons so that current is flowing freely to a single spark plug only, until all four cylinders have been tested.

Although I have particularly referred to and have shown in the drawings a device having four indicators or testing elements, it will be understood that any number may be employed in the same manner and for obtaining the same results, depending entirely upon the number of spark plugs and cylinders involved.

In Fig. 6, I have shown an indicating unit which is applicable to a single cylinder, and which may be combined with similar units for a plurality of cylinders; it being only necessary to properly connect the contact points carried thereby with the desired electrical devices, the spark plugs and a bus bar which may be common to a plurality of said units and properly grounded.

Although I have shown a sparking device, it will be understood that my improved instrument may be employed to effect the showing of a visual signal by closing a circuit when a push button is operated.

I claim:

1. In an electrical indicating device, the combination of a pair of contacts normally separated, one of which is movable, said movable contact being grounded, a spark plug in electrical connection with one of said contacts, means for bringing said contacts into such relation with each other as to form jump sparks, and means for automatically restoring said contacts to their normal separated position.

2. In an electrical indicating device, the combination of a pair of contacts normally separated, one of which is movable, one of which is adjustable, one of said contacts being grounded, a spark plug in electrical connection with one of said contacts, means for effecting movement of one of said contacts with respect to the other so as to form a jump spark, and means for automatically restoring said contact to its normal position.

3. In an electrical indicating device, the combination of a movable grounded contact, a second contact, a spark plug, said spark plug being in electrical connection with said movable contact, means for bringing said respective contacts into such relation with each other as to form jump sparks, and means for automatically restoring said contacts to their normal position.

4. In an electrical indicating device, the combination of a pair of contacts normally separated, one of which is grounded, said grounded contact being movable with respect to the other, a spark plug, said spark plug being in electrical connection with the non-grounded contact, means for bringing said contacts into such position with relation to each other as to form jump sparks, means for adjusting the position of one of said contacts to regulate the extent of the gap between such points, and means for automatically restoring said contacts to their normal position.

5. In an electrical indicating device, the combination of an adjustable contact point, a grounded contact point movable with respect to the adjustable point, a spark plug, said spark plug being in electrical connection with the non-grounded movable contact point, means for moving one of said contact points into such relation with the other as to form jump sparks, means for adjusting said contact points to regulate the extent of the gap between the same, and means for automatically restoring said contacts to their normal non-sparking position.

6. In an electrical indicating device, the combination with a plurality of spark plugs, of a shell or casing, a plurality of terminals within said shell electrically connected with said spark plugs, a plurality of terminals in axial alinement with and normally separated from the terminals connected with the spark plugs, means whereby the alined terminals may be brought into such position with respect to each other as to form a spark gap, and means for automatically separating said terminals after the means employed for bringing them into sparking position has been released.

7. In an electrical indicating device, the combination of a pair of contacts, one of which is movable, said movable contact being grounded, a spark plug in electrical connection with one of said contacts and a source of electrical energy, means for bringing said contacts into such relation with each other as to effect the formation of a visual signal, and means for automatically restoring said contacts to their normal position after the formation of such signal.

In testimony whereof, I have signed my name to this specification, in the presence of two subscribing witnesses.

RICHARD SCOTT SMITH, Jr.

Witnesses:
MURRAY C. BOYER,
WM. A. BARR.